(12) United States Patent
Martin et al.

(10) Patent No.: US 12,012,646 B1
(45) Date of Patent: *Jun. 18, 2024

(54) ADDITIVELY MANUFACTURING COMPONENTS CONTAINING NICKEL ALLOYS, AND FEEDSTOCKS FOR PRODUCING THE SAME

(71) Applicant: HRL Laboratories, LLC, Malibu, CA (US)

(72) Inventors: John H. Martin, Oxnard, CA (US); Julie Miller, Los Angeles, CA (US); Brennan D. Yahata, Los Angeles, CA (US); Randall C. Schubert, Santa Monica, CA (US); Jacob M. Hundley, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/209,036

(22) Filed: Dec. 4, 2018

Related U.S. Application Data

(63) Continuation-in-part of application No. 15/996,438, filed on Jun. 2, 2018, now abandoned, and a
(Continued)

(51) Int. Cl.
*C22C 19/05* (2006.01)
*B22F 1/054* (2022.01)
(Continued)

(52) U.S. Cl.
CPC ............ *C22C 19/057* (2013.01); *B22F 1/054* (2022.01); *B23K 26/342* (2015.10); *B33Y 70/00* (2014.12); *B33Y 80/00* (2014.12); *B22F 2301/15* (2013.01)

(58) Field of Classification Search
CPC ................... C22C 19/057; C22C 32/00–0078
See application file for complete search history.

(56) References Cited

U.S. PATENT DOCUMENTS 3,218,135 A * 11/1965 Alexander .......... C22C 32/0015
428/565
5,305,726 A    4/1994 Scharman et al.
(Continued)

FOREIGN PATENT DOCUMENTS

JP      2011054892 A       3/2011
JP      2013196936 A  *    9/2013
(Continued)

OTHER PUBLICATIONS

Robert Naumann; "Introduction to the Physics and Chemistry of Materials", CRC Press, 2008, p. 98-99 (Year: 2008).*
(Continued)

*Primary Examiner* — Alexandra M Moore
*Assistant Examiner* — Austin Pollock
(74) *Attorney, Agent, or Firm* — O'Connor & Company; Ryan P. O'Connor

(57) ABSTRACT

Some variations provide an additively manufactured metal-containing component comprising (i) nickel, (ii) aluminum and/or titanium, and (iii) nanoparticles, wherein the sum of aluminum weight percentage and one-half of titanium weight percentage is at least 3 on a nanoparticle-free basis, and wherein the additively manufactured metal-containing component has a microstructure that is substantially crack-free with equiaxed grains. A feedstock composition is also provided, comprising metal-containing microparticles and nanoparticles, wherein the nanoparticles are chemically and/or physically disposed on surfaces of the microparticles, wherein the microparticles comprise (i) nickel and (ii) aluminum and/or titanium, and wherein the sum of aluminum weight percentage and one-half of titanium weight
(Continued)

percentage is at least 3 on a nanoparticle-free basis. The nanoparticles may be selected from metals; ceramics; cermets; intermetallic alloys; oxides, carbides, nitrides, borides, or hydrides thereof; polymers; and/or carbon. Successful nanofunctionalization of MAR-M-247 nickel superalloy is demonstrated, creating a crack-free additively manufactured microstructure.

10 Claims, 5 Drawing Sheets

Related U.S. Application Data continuation-in-part of application No. 15/880,488, filed on Jan. 25, 2018, now Pat. No. 11,117,193.

(60) Provisional application No. 62/657,984, filed on Apr. 16, 2018, provisional application No. 62/540,615, filed on Aug. 3, 2017, provisional application No. 62/463,952, filed on Feb. 27, 2017, provisional application No. 62/463,991, filed on Feb. 27, 2017, provisional application No. 62/452,989, filed on Feb. 1, 2017.

(51) Int. Cl.
*B23K 26/342*  (2014.01)
*B33Y 70/00*  (2020.01)
*B33Y 80/00*  (2015.01)

(56) References Cited

U.S. PATENT DOCUMENTS

| | | | |
|---|---|---|---|
| 5,340,012 A | 8/1994 | Beeferman et al. | |
| 5,462,712 A | 10/1995 | Langan et al. | |
| 6,024,915 A | 2/2000 | Kume et al. | |
| 6,071,628 A | 6/2000 | Seals et al. | |
| 6,254,757 B1 | 7/2001 | Lashmore et al. | |
| 6,368,427 B1 | 4/2002 | Sigworth | |
| 9,238,877 B2 | 1/2016 | Krause et al. | |
| 10,030,292 B2 * | 7/2018 | Martin | B22F 1/02 |
| 2002/0136884 A1 | 9/2002 | Oechsner | |
| 2003/0035955 A1 * | 2/2003 | Yadav | B29B 9/12 |
| | | | 428/403 |
| 2003/0077473 A1 | 4/2003 | Bretschneider et al. | |
| 2003/0104147 A1 | 6/2003 | Bretschneider et al. | |
| 2005/0133121 A1 * | 6/2005 | Subramanian | C22C 1/05 |
| | | | 148/325 |
| 2005/0238528 A1 | 10/2005 | Lin et al. | |
| 2006/0065330 A1 | 3/2006 | Cooper et al. | |
| 2010/0288243 A1 | 11/2010 | Kaburagi et al. | |
| 2012/0135142 A1 | 5/2012 | Yang et al. | |
| 2012/0315399 A1 | 12/2012 | Feng et al. | |
| 2013/0012643 A1 | 1/2013 | Monsheimer et al. | |
| 2013/0146041 A1 | 6/2013 | Dijii et al. | |
| 2013/0152739 A1 | 6/2013 | Li et al. | |
| 2013/0288049 A1 * | 10/2013 | Sample | B21C 23/002 |
| | | | 428/338 |
| 2014/0034626 A1 * | 2/2014 | Illston | B22F 3/15 |
| | | | 219/121.78 |
| 2014/0072823 A1 * | 3/2014 | Hertter | B22F 1/02 |
| | | | 428/570 |
| 2014/0295087 A1 * | 10/2014 | Rickenbacher | B22F 3/24 |
| | | | 427/383.1 |
| 2015/0132605 A1 * | 5/2015 | Kumar | B23K 35/0222 |
| | | | 228/256 |
| 2015/0252451 A1 | 9/2015 | Al-Aqeeli et al. | |
| 2015/0337423 A1 * | 11/2015 | Martin | C22C 49/00 |
| | | | 75/230 |
| 2016/0193696 A1 * | 7/2016 | McFarland | B22F 10/70 |
| | | | 219/76.12 |
| 2016/0273079 A1 * | 9/2016 | Das | F01D 5/286 |
| 2016/0279703 A1 * | 9/2016 | Clare | C23C 4/10 |
| 2016/0279704 A1 * | 9/2016 | She | B23K 15/0093 |
| 2016/0304677 A1 * | 10/2016 | Evans | B01J 13/02 |
| 2016/0332253 A1 * | 11/2016 | Nardi | C04B 35/46 |
| 2016/0339517 A1 * | 11/2016 | Joshi | B33Y 10/00 |
| 2017/0016095 A1 | 1/2017 | Karlen et al. | |
| 2017/0209923 A1 * | 7/2017 | Giovannetti | B23K 26/342 |
| 2017/0252851 A1 | 9/2017 | Fulop et al. | |
| 2018/0369908 A1 * | 12/2018 | Muto | B22F 1/02 |
| 2019/0275587 A1 * | 9/2019 | Matsuoka | B22F 10/34 |

FOREIGN PATENT DOCUMENTS

| | | |
|---|---|---|
| KR | 1020080105250 A | 12/2008 |
| WO | 2005017220 A1 | 2/2005 |

OTHER PUBLICATIONS

Casati R.; "Aging Behavior of High-Strength Al Alloy 2618 Produced by Selective Laser Melting"; Minerals, Metals, & Materials Society and ASM International; vol. 48A, (Year: 2016).*
Alloy digest, "Microcast X-Mar-M-247", 1995 (Year: 1995).*
Binczyk F., et al.; "Modification of Macrostructure of Nickel Superalloys with Cobalt Nanoparticles", Composites, vol. 11, 2011, 49-54 (Year: 2011).*
Basak A..; Microstructural Characterization of MAR-M247 Fabricated Through Scanning Laser Epitaxy; Solid Freeform Fabrication 2016: Proceedings of the 27th Annual International Solid Freeform Fabrication Symposium (Year: 2016).*
Chen et al., "Rapid control of phase growth by nanoparticles," Nature Communications 5:3879 DOI: 10.1038/ncomms4879.
Sheppard et al., "The Mechanochemical synthesis of magnesium hydride nanoparticles" Journal of Alloys and Compounds 492 (2010) L72-L74.
Zhu et al., "Growth Mechanism for the Controlled Synthesis of MgH2/Mg Crystals via a Vapor-Solid Process" Cryst. Growth Des. 2011, 11, 4166-4174.
Högberg et al., "Reactive sputtering of δ-ZrH2 thin films by high power impulse magnetron sputtering and direct current magnetron sputtering," Journal of Vacuum Science & Technology A 2014, 32, 041510.
Gharatloo et al., "Ultrasound-assisted synthesis of nano-structured zirconium hydride at room temperature," International Journal of Hydrogen Energy 40 (2015) 13942-13948.
Mukherjee et al., "Printability of alloys for additive manufacturing" Scientific Reports | 6:19717 | DOI: 10.1038/srep19717, Jan. 22, 2016.
He et al., "Alloying element vaporization during laser spot welding of stainless steel" J. Phys. D: Appl. Phys. 36 (2003) 3079-3088.
Bartkowiak et al., "New Developments of Laser Processing Aluminium Alloys via Additive Manufacturing Technique" Physics Procedia 12 (2011) 393-401.
Zhang et al., "Grain Refinement and Mechanical Properties of Cu—Cr—Zr Alloys with Different Nano-Sized TiCp Addition" Materials 2017, 10, 919; doi:10.3390/ma10080919.
Roberts et al., "A novel processing approach for additive manufacturing of commercial aluminum alloys" Physics Procedia 83 ( 2016 ) 909-917.
Martin et al., "3D printing of high-strength aluminium alloys" Nature, vol. 549, Sep. 21, 2017.
Doi et al., "Gamma/Gamma-Prime Microstructure Formed by Phase Separation of Gamma-Prime Precipitates in A Ni—Al—Ti Alloy" Superalloys 2004, TMS (The Minerals, Metals & Materials Society), 2004.
Henderson et al., "Nickel based superalloy welding practices for industrial gas turbine applications", Science and Technology of Welding and Joining, 9:1, 13-21, 2004.

* cited by examiner

ADDITIVELY MANUFACTURING COMPONENTS CONTAINING NICKEL ALLOYS, AND FEEDSTOCKS FOR PRODUCING THE SAME

PRIORITY DATA

This patent application is a non-provisional application with priority to U.S. Provisional Patent App. No. 62/657,984, filed on Apr. 16, 2018, which is hereby incorporated by reference herein. This patent application is also a continuation-in-part application of U.S. patent application Ser. No. 15/880,488, filed on Jan. 25, 2018 and a continuation-in-part application of U.S. patent application Ser. No. 15/996,438, filed on Jun. 2, 2018, each of which is hereby incorporated by reference herein.

FIELD OF THE INVENTION

The present invention generally relates to additively manufactured nickel-containing materials produced starting with functionalized feedstocks.

BACKGROUND OF THE INVENTION

Metal-based additive manufacturing, or three-dimensional (3D) printing, has applications in many industries, including the aerospace and automotive industries. Building up metal components layer-by-layer increases design freedom and manufacturing flexibility, thereby enabling complex geometries while eliminating traditional economy-of-scale constraints. In metal-based additive manufacturing, application of a direct energy source, such as a laser or electron beam, to melt alloy powders locally results in solidification rates between 0.1 m/s and 5 m/s, an order of magnitude increase over conventional casting processes.

Additive manufacturing allows for one-step fabrication of complex parts of arbitrary design. Additive manufacturing eliminates the need for assembling multiple components or setting up new equipment, while minimizing manufacturing time and wastage of materials and energy. Although additive manufacturing is rapidly growing to produce metallic, polymeric, and ceramic components, production of metallic parts is its fastest growing sector.

During additive manufacturing, a direct energy source locally melts metal alloy powders or wires and builds up a part layer by layer. During this process, epitaxial growth off of the preceding layer usually produces columnar growth. These columnar grains reach a coherency point at low fractions of solid, thereby pinching off backfill of the liquid. Continued solidification and thermal shrinkage causes cavitation of trapped liquid and results in the formation and propagation of cracks. This phenomenon is common in many unweldable alloy systems, including (but not limited to) high-γ' superalloys such as MAR-M-247. Fine equiaxed microstructures accommodate strain in the semi-solid state by suppressing coherency that locks the orientation of these solid dendrites and promotes tearing. Producing equiaxed structures conventionally requires large amounts of undercooling, which has proven difficult in additive processes where high thermal gradients arise from rastering of a direct energy source in an arbitrary geometric pattern.

Currently only a few alloys, such as AlSi10Mg, TiAl6V4, CoCr, and Inconel 718, can be reliably additively manufactured. Without the benefit of technology being developed by HRL Laboratories, LLC, the vast majority of the more than 5,500 alloys in use today cannot be additively manufactured because the melting and solidification dynamics during the printing process lead to intolerable microstructures with large columnar grains and cracks. 3D-printable metal alloys are limited to those known to be easily weldable. The limitations of the currently printable alloys, especially with respect to specific strength, fatigue life, and fracture toughness, have hindered metal-based additive manufacturing. See Martin et al., "3D printing of high-strength aluminium alloys," *Nature* vol. 549, pages 365-369 (2017), which is hereby incorporated by reference herein.

Nickel-based superalloys contain at least Ni, Al, and Ti. Most nickel-based superalloys also contain Cr, Co, and small amounts of B, Zr, and C. Other potential elements in the nickel-based superalloys are Mo, W, Ta, Hf, and Nb. Increasingly, there is a requirement for high-integrity, defect-free (or limited defects) welding of high-temperature-capability, precipitation-strengthened nickel alloys, as well as more advanced nickel alloys such as those used for directionally solidified and single-crystal castings (e.g., MAR-M-247 superalloy).

Nickel superalloys are used, for example, in the manufacture of a wide range of hot-gas-path components such as discs, casings, stator vane segments, and turbine blades. Welding of these superalloys presents a problem arising from their highly alloyed nature and the more complex grain-boundary and precipitate-strengthening mechanisms needed to provide high-temperature strength in service. The inherent capabilities of these superalloys often interact in a detrimental manner with the thermal and mechanical loadings generated by the heat source and the component mass and jigging constraints applied during welding. Local changes in microstructure adjacent to the weld bead, such as particle coarsening, dissolution, and grain growth within the heat-affected zone, can lead to significant property changes during the heating cycle. In an effort to minimize these interactions, many higher-strength alloys are welded in a solution-annealed or softened condition. However, despite these efforts, many highly strengthened alloys continue to be susceptible to several types of cracking and defects. For a wide range of materials—in particular, high-strength cast alloys such as IN738, IN939, MAR-M-247 and cast forms of IN718—it has generally not been possible to avoid heat-affected-zone fissuring using conventional processing. See Henderson et al. "Nickel-Based Superalloy Welding Practices for Industrial Gas Turbine Applications", *Science and Technology of Welding and Joining* Volume 9, Issue 1, 13-21 (2004), which is hereby incorporated by reference herein.

Solidification cracking occurs within a newly formed weld bead when the two-phase liquid-solid region experiences tensile stresses and the high fraction of solid present restricts the flow of liquid metal to backfill the interdendritic regions. These interdendritic regions are torn apart by tensile thermal stresses generated behind the weld bead as it progresses. Solidification crack formation is dependent upon a number of contributory factors such as thermally induced stresses and strains being generated behind the weld bead, solidification and microsegregation, viscous flow of liquid metal, and crack initiation and propagation effects. Formation is promoted by a wide solidification range for the alloy (dilute and eutectic-forming alloys are generally less susceptible) and low welding traverse speeds that promote the generation of tensile stresses transverse to the trailing edge of the weld as a result of contraction of the surrounding solid material.

Strain age or reheat cracking, generally, occurs in γ'-$Ni_3$(Al, Ti) precipitate-strengthened alloys during post-weld heat treatment or subsequent high-temperature service as a result of the presence of either residual stresses developed during manufacture, or applied stresses arising from service exposure. These defects may be characterized by intergranular microcracking in either the heat-affected zone or weld bead and form as a consequence of precipitation and hardening of the alloy during thermal exposure and transfer of solidification strains onto the grain boundaries. It is common practice to attempt to relieve residual stresses arising from the welding procedure by means of post-weld heat treatment. However, often the stress-relieving temperature is greater than the aging temperature of the alloy and this leads to a transient precipitation period during post-weld heating that hardens the alloy and leads to excessive strain localization on grain boundaries within the heat-affected zone and weld bead during heating. The susceptibility to strain age cracking is promoted by high additions of both Ti and Al, promoting $\gamma'$ precipitation, as well as elements such as C, S, and B.

The weldability of nickel-based superalloys and the susceptibility to strain age cracking can be assessed by plotting the Al versus Ti content of the alloy, as shown in FIG. 5 of Henderson et al., cited above, and reproduced in FIG. 1 in this patent application. When the total Al+Ti level for a particular alloy exceeds a critical value, it is difficult to weld and is increasingly unweldable with increasing Al+Ti content. Because the underlying melting and solidification mechanisms are similar for welding and additive manufacturing, FIG. 1 is also applicable for additive manufacturability of nickel-based superalloys, as well.

It is commercially desired to overcome the above-mentioned constraints for the weldability, and additive manufacturability, of nickel-based superalloys. For example, it is desired to be able to process high-$\gamma'$ nickel superalloys in additive manufacturing with wide parametric processing windows and without significant cracking. Suitable feedstocks are also desired.

SUMMARY OF THE INVENTION

The present invention addresses the aforementioned needs in the art, as will now be summarized and then further described in detail below.

Some variations provide an additively manufactured metal-containing component comprising (i) nickel, (ii) aluminum and/or titanium, and (iii) nanoparticles, wherein the sum of aluminum weight percentage and one-half of titanium weight percentage is at least 3 on a nanoparticle-free basis, and wherein the additively manufactured metal-containing component has a microstructure that is substantially crack-free with equiaxed grains.

In some embodiments, the additively manufactured metal-containing component contains about 1.5 wt % aluminum, or more, on a nanoparticle-free basis. In these or other embodiments, the additively manufactured metal-containing component contains about 0.5 wt % titanium, or more, on a nanoparticle-free basis. In some embodiments, the additively manufactured metal-containing component contains both aluminum and titanium.

In some embodiments, the additively manufactured metal-containing component contains the nanoparticles at a concentration from about 0.01 vol % to about 5 vol %, such as from about 0.1 vol % to about 2 vol %, on a total additively manufactured metal-containing component volume basis.

In various embodiments, the nanoparticles may be selected from the group consisting of metals; ceramics; cermets; intermetallic alloys; oxides, carbides, nitrides, borides, or hydrides thereof; polymers; carbon; and combinations of any of the foregoing.

The nanoparticles may contain at least one element selected from the group consisting of Ce, Co, Al, Ti, V, Sc, Cr, Mn, Fe, Ni, Si, Y, Zr, Nb, Mo, Pd, Hf, Ta, W, Re, Os, Ir, Pt, La, and Yb, for example.

In certain embodiments, the nanoparticles are in the form of cubic spinels containing (i) oxygen and/or sulfur and (ii) at least two elements selected from the group consisting of Al, Co, Ni, Fe, Mn, Cr, Ti, Ce, Zr, Hf, Ta, and Nb.

In some embodiments, the additively manufactured metal-containing component further contains one or more alloying elements, separate from the nanoparticles, selected from the group consisting of H, Li, Be, B, C, N, O, F, Na, P, S, Cl, K, Si, Fe, Cu, Mn, Mg, Cr, V, Bi, Pb, Zr, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof.

In some embodiments, the additively manufactured metal-containing component contains, on a nanoparticle-free basis, about 50-65 wt % Ni, about 8-10 wt % Co, about 8-10 wt % W, about 7-9 wt % Cr, about 4-6 wt % Al, about 1-4 wt % Ta, about 1-2 wt % Hf, about 1-2 wt % Ti, about 0-1 wt % Mo, and about 0-0.5 wt % C.

The additively manufactured metal-containing component may be characterized by an average grain size of less than 10 microns, such as about 1 micron or less.

The additively manufactured metal-containing component microstructure may contain a plurality of dendrite layers having differing primary growth-direction angles with respect to each other. The microstructure may have a crystallographic texture that is not solely oriented in an additive-manufacturing build direction.

Other variations provide a welded metal-containing component comprising (i) nickel, (ii) aluminum and/or titanium, and (iii) nanoparticles, wherein the sum of aluminum weight percentage and one-half of titanium weight percentage is at least 3 on a nanoparticle-free basis, and wherein the welded metal-containing component has a microstructure that is substantially crack-free with equiaxed grains.

Some variations of the invention provide a feedstock composition comprising metal-containing microparticles and nanoparticles, wherein the nanoparticles are smaller than the microparticles in at least one dimension, wherein the nanoparticles are chemically and/or physically disposed on surfaces of the microparticles, wherein the microparticles comprise (i) nickel and (ii) aluminum and/or titanium, and wherein the sum of aluminum weight percentage and one-half of titanium weight percentage is at least 3 on a nanoparticle-free basis.

In some embodiments, the composition contains both aluminum and titanium.

In some embodiments, the composition contains the nanoparticles at a concentration from about 0.01 vol % to about 5 vol % on a total composition basis.

The nanoparticles are consolidated in a three-dimensional architecture throughout the composition, in some embodiments.

The nanoparticles may be selected from the group consisting of metals; ceramics; cermets; intermetallic alloys; oxides, carbides, nitrides, borides, or hydrides thereof; polymers; carbon; and combinations of any of the foregoing.

In certain embodiments, the nanoparticles contain at least one element selected from the group consisting of Ce, Co, Al, Ti, V, Sc, Cr, Mn, Fe, Ni, Si, Y, Zr, Nb, Mo, Pd, Hf, Ta, W, Re, Os, Ir, Pt, La, and Yb.

In certain compositions, the nanoparticles are in the form of cubic spinels containing (i) oxygen and/or sulfur and (ii) at least two elements selected from the group consisting of Al, Co, Ni, Fe, Mn, Cr, Ti, Ce, Zr, Hf, Ta, and Nb.

The composition may further contain one or more alloying elements, separate from the nanoparticles, selected from the group consisting of H, Li, Be, B, C, N, O, F, Na, P, S, Cl, K, Si, Fe, Cu, Mn, Mg, Cr, V, Bi, Pb, Zr, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof.

In some embodiments, the composition contains, on a nanoparticle-free basis, about 50-65 wt % Ni, about 8-10 wt % Co, about 8-10 wt % W, about 7-9 wt % Cr, about 4-6 wt % Al, about 1-4 wt % Ta, about 1-2 wt % Hf, about 1-2 wt % Ti, about 0-1 wt % Mo, and about 0-0.5 wt % C.

The composition may be an additive manufacturing feedstock. Alternatively, or additionally, the composition may be a welding feedstock.

Other variations provide a method of making an additively manufactured or welded metal-containing component, the method comprising:
(a) obtaining a composition comprising metal-containing microparticles and nanoparticles, wherein the nanoparticles are smaller than the microparticles in at least one dimension, wherein the nanoparticles are chemically and/or physically disposed on surfaces of the microparticles, wherein the microparticles comprise (i) nickel and (ii) aluminum and/or titanium, and wherein the sum of aluminum weight percentage and one-half of titanium weight percentage is at least 3 on a nanoparticle-free basis;
(b) exposing a first amount of the composition to an energy source for melting the first amount of the composition, thereby generating a first melt layer; and
(c) solidifying the first melt layer, thereby generating an additively manufactured or welded metal-containing component,
wherein the additively manufactured or welded metal-containing component has a microstructure that preferably is substantially crack-free with equiaxed grains.

DETAILED DESCRIPTION OF EMBODIMENTS OF THE INVENTION

Figure 1:
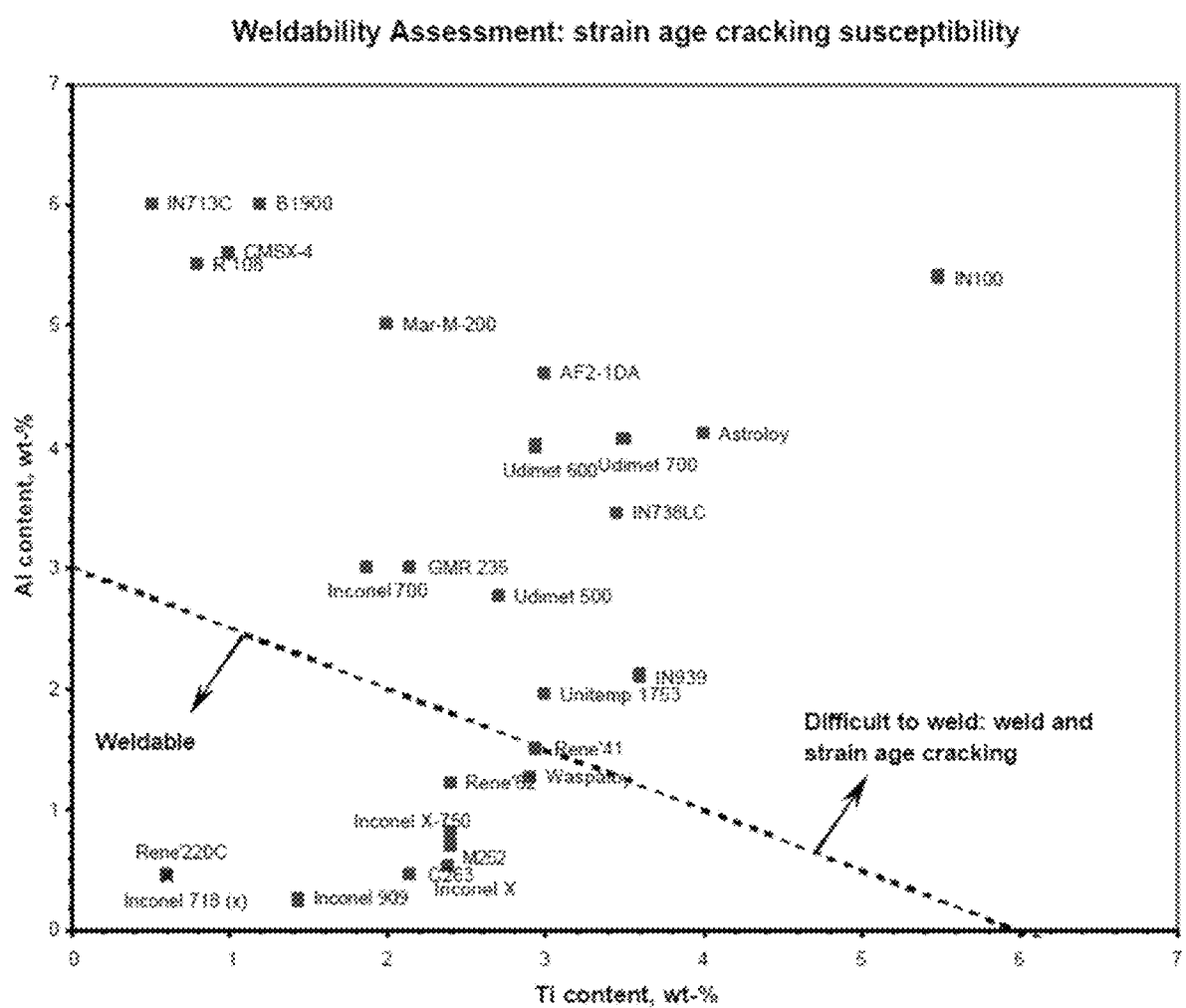
FIG. 1 shows known crack susceptibility vs. Ti and Al content for nickel superalloys, in some embodiments.

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Variations of this disclosure are predicated on metal alloy functionalization to enable the processing of nickel-based superalloys (such as, but not limited to, MAR-M-247) with minimal to no cracking in additive manufacturing, opening up a variety of high-temperature applications. Variations herein enable the production of additively manufactured high-temperature metal alloys with operating temperatures at least 100° C. greater than for current high-temperature alloys, including Inconel Alloy 625 and Inconel Alloy 718. Such additively manufactured high-temperature metal alloys can be used in hypersonic, turbine, or other high-temperature applications.

As explained in the Background, the formation and propagation of cracks is common in high-γ' nickel superalloys. The principles of this disclosure provide a route for processing high-γ' superalloys in additive manufacturing without significant cracking. Heretofore, there are no known methods for additive manufacturing of high-γ' nickel superalloys in the crack-susceptible region (FIG. 1).

Nickel superalloys with high-temperature properties typically contain high concentrations of aluminum and titanium which aid in the high-volume-fraction formation of the $L1_2$ γ' phase. These alloying elements, however, tend to promote hot cracking during processing, due to solute rejection. Crack susceptibility vs. composition for nickel superalloys is shown in FIG. 1 (Ti and Al content on x-axis and y-axis, respectively), which is adapted from FIG. 5 of Henderson et al., "Nickel-Based Superalloy Welding Practices for Industrial Gas Turbine Applications", *Science and Technology of Welding and Joining* Volume 9, Issue 1, 13-21 (2004), which is hereby incorporated by reference herein.

The "weldability" line of FIG. 1 can be defined mathematically as (wt % Al)=3–0.5 (wt % Ti) on a plot of wt % Al versus wt % Ti contained in the Ni alloy. The "difficult to weld" region is thus defined by (wt % Al)≥3–0.5 (wt % Ti) on a plot of wt % Al versus wt % Ti contained in the Ni alloy (i.e. the upper region of FIG. 1). This equation means that the sum of aluminum weight percentage and one-half of titanium weight percentage is at least 3.

Some variations provide an additively manufactured metal-containing component comprising (i) nickel, (ii) aluminum and/or titanium, and (iii) nanoparticles, wherein the sum of aluminum weight percentage and one-half of titanium weight percentage is at least 3 on a nanoparticle-free basis, and wherein the additively manufactured metal-containing component has a microstructure that is substantially crack-free with equiaxed grains.

By "component" it is meant any object that is additively manufactured, with arbitrary geometry and size. During additive manufacturing, material is deposited layer by layer to build up a part of arbitrary geometry. Conventional processing such as casting or machining is limited by process-specific design criteria or line-of-sight manufacturing, which restricts the potential geometries. Additive manufacturing overcomes these limitations by starting with powder or wire material at a finer scale than the target geometries being built, and locally melting or sintering these materials together to build the component from the ground up. In principle, any geometry can be created.

The presence of nanoparticles provides nanofunctionalization of the nickel superalloy particles. Generally, functionalization utilizes significantly different particle or particulate sizes (compared to the base particle being functionalized) and is not limited to the functionalizing agent being of nanometer size. In some embodiments, the nanoparticles have a largest dimension between about 1 nm and about 5000 nm. A preferred size of nanoparticles is about 2000 nm or less, about 1500 nm or less, or about 1000 nm or less. In various embodiments, the nanoparticles have an average particle size of about, at least about, or at most about 10, 50, 100, 200, 300, 400, 500, 750, 1000, 2000, 3000, 4000, or 5000 nanometers. In certain embodiments, nanoparticles are at least 50 nm in size.

In certain embodiments, microparticles are used in place of nanoparticles, or nanoparticles form larger inclusions that may be classified as microparticles. Microparticles are particles with the largest dimension between about 1 micron and about 1000 microns. For convenience of nomenclature, microparticles are referred to as nanoparticles herein, unless indicated otherwise.

The nanoparticle or microparticle size may be selected based on the desired properties and function of the final assembly. Preferably, the ratio of average particle size of nickel superalloy particles (or grains) to the average particle size of the nanoparticles or microparticles is at least 5, 10, 20, 50, or 100.

Particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

A metal-containing component microstructure that has "equiaxed grains" means that at least 90 vol %, preferably at least 95 vol %, and more preferably at least 99 vol % of the metal-containing component contains grains that are roughly equal in length, width, and height. In preferred embodiments, at least 99 vol % of the metal-containing component contains a plurality of grains for which each of the standard deviations of the grain length, the grain width, and the grain height are less than 25%, preferably less than 10%, and more preferably less than 5% of the average values of the grain length, the grain width, and the grain height, respectively. In the metal-containing component, crystals of metal alloy form grains in the solid. Each grain is a distinct crystal with its own orientation. The areas between grains are known as grain boundaries. Within each grain, the individual atoms form a crystalline lattice. In this disclosure, equiaxed grains result when there are many nucleation sites arising from grain-refining nanoparticles contained in the metal-containing component microstructure.

A metal-containing component microstructure that is "substantially crack-free" means that at least 99.9 vol % of the metal-containing component contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. The non-desirable material disposed within the crack may itself contain a higher porosity than the bulk material, may contain a different crystalline (or amorphous) phase of solid, or may be a different material altogether, arising from impurities during fabrication, for example. Large phase boundaries can also form cracks.

The metal-containing component microstructure may be substantially free of porous defects, in addition to being substantially crack-free. "Substantially free of porous defects" means at least 99 vol % of the metal alloy contains no porous voids having an effective diameter of at least 1 micron.

Preferably, at least 80 vol %, more preferably at least 90 vol %, even more preferably at least 95 vol %, and most preferably at least 99 vol % of the metal-containing component contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal-containing component contains no larger porous voids having an effective diameter of at least 5 microns. For example, see the microstructure of FIG. 3B which contains a few porous voids (but contains no cracks).

Typically, a porous void contains open space, which may be vacuum or may contain a gas such as air, $CO_2$, $N_2$, and/or Ar. Porous voids may be reduced or eliminated, in some embodiments. For example, additively manufactured metal parts may be hot-isostatic-pressed to reduce residual porosity, such as to generate a final additively manufactured metal part that is substantially free of porous defects in addition to being substantially crack-free.

In some embodiments, the additively manufactured metal-containing component contains about 1.5 wt % aluminum, or more, on a nanoparticle-free basis. In these or other embodiments, the additively manufactured metal-containing component contains about 0.5 wt % titanium, or more, on a nanoparticle-free basis. In some embodiments, the additively manufactured metal-containing component contains both aluminum and titanium.

In various embodiments, the additively manufactured metal-containing component contains, on a nanoparticle-free basis, about 40-80 wt % Ni, about 0-10 wt % Al, and about 0-10 wt % Ti, wherein the sum of wt % Al+0.5×wt % Ti is at least 3 on a nanoparticle-free basis, and wherein the additively manufactured metal-containing component has a microstructure that is substantially crack-free with equiaxed grains.

A nanoparticle-free basis for the composition is useful when comparing against prior-art compositions (e.g., in FIG. 1) that do not incorporate nanoparticles as taught herein. In other embodiments, however, nanoparticles are included in the calculations of wt % nickel, wt % aluminum, and wt % titanium.

In some embodiments, the additively manufactured metal-containing component contains the nanoparticles at a concentration from about 0.01 vol % to about 5 vol %, such as from about 0.1 vol % to about 2 vol %, on a total additively manufactured metal-containing component volume basis.

The nanoparticles are preferably present in a concentration of at least 0.01 vol %, such as at least 0.1 vol %, at least 1 vol %, or at least 5 vol %, in the metal-containing component. In various embodiments, the nanoparticles are present in a concentration of about, or at least about, 0.1, 0.2, 0.5, 1, 2, 3, 4, 5, 6, 7, 8, 9, or 10 vol %. The concentration of the nanoparticles may be varied by adjusting the amount of nanoparticles on the particle surface, and/or by adjusting the concentration of surface-functionalized precursors (containing nanoparticles on surfaces) versus non-surface-functionalized precursors (not containing nanoparticles on surfaces) in the feedstock material, for example.

In various embodiments, the nanoparticles may be selected from the group consisting of metals; ceramics; cermets; intermetallic alloys; oxides, carbides, nitrides, borides, or hydrides of metals, ceramics, cermets, or intermetallic alloys; polymers; carbon; and combinations of any of the foregoing.

The nanoparticles may contain at least one element selected from the group consisting of Ce, Co, Al, Ti, V, Sc, Cr, Mn, Fe, Ni, Si, Y, Zr, Nb, Mo, Pd, Hf, Ta, W, Re, Os, Ir, Pt, La, and Yb, for example.

In certain embodiments, the nanoparticles are in the form of cubic spinels containing (i) oxygen and/or sulfur and (ii) at least two elements selected from the group consisting of Al, Co, Ni, Fe, Mn, Cr, Ti, Ce, Zr, Hf, Ta, and Nb.

Nanoparticles, in certain embodiments, are selected from the group consisting of $Al_3Zr$, $Al_3Ta$, $Al_3Nb$, $Al_3Ti$, TiB, $TiB_2$, WC, AlB, and combinations thereof. These multicomponent nanoparticles may be in place of, or in addition to, elemental forms such as zirconium, tantalum, niobium, titanium, or oxides, nitrides, hydrides, carbides, or borides thereof.

In some embodiments, the nanoparticles may form nanoparticle inclusions within the additively manufactured metal-containing component. The additively manufactured metal-containing component may comprise inclusions that contain both (i) at least one of the one or more metals and (ii) at least one of the one or more nanoparticle elements. An example of an inclusion is $Al_3Zr$ in which the aluminum atoms are derived from an aluminum-containing precursor (e.g., an aluminum alloy powder) and the zirconium atom is derived from zirconium-containing nanoparticles (e.g., Zr or $ZrH_2$ nanoparticles). During additive manufacturing, a chemical reaction may take place to form $Al_3Zr$ nanoparticle inclusions which themselves act as grain-refining nanoparticle inclusions.

The nanoparticles and/or nanoparticle inclusions may be consolidated in a three-dimensional architecture throughout the additively manufactured metal-containing component, in some embodiments.

In some embodiments, the additively manufactured metal-containing component further contains one or more alloying elements, separate from the nanoparticles, selected from the group consisting of H, Li, Be, B, C, N, O, F, Na, P, S, Cl, K, Si, Fe, Cu, Mn, Mg, Cr, V, Bi, Pb, Zr, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof.

In some embodiments, the additively manufactured metal-containing component contains, on a nanoparticle-free basis, about 50-65 wt % Ni, about 8-10 wt % Co, about 8-10 wt % W, about 7-9 wt % Cr, about 4-6 wt % Al, about 1-4 wt % Ta, about 1-2 wt % Hf, about 1-2 wt % Ti, about 0-1 wt % Mo, and about 0-0.5 wt % C.

The additively manufactured metal-containing component may be characterized by an average grain size of less than 1 millimeter. In some embodiments, the additively manufactured metal-containing component is characterized by an average grain size of less than 10 microns. In certain embodiments, the additively manufactured metal-containing component is characterized by an average grain size of less than 1 micron, or less than 0.1 microns. In various embodiments, the metal-containing component may be characterized by an average grain size of about, or less than about, 500 microns, 400 microns, 300 microns, 200 microns, 100 microns, 50 microns, 25 microns, 10 microns, 5 microns, 2 microns, 1 micron, 0.5 microns, 0.2 microns, or 0.1 microns.

The additively manufactured metal-containing component microstructure may contain a plurality of dendrite layers having differing primary growth-direction angles with respect to each other. The additively manufactured metal-containing component microstructure may have a crystallographic texture that is not solely oriented in an additive-manufacturing build direction. The plurality of dendrite layers (e.g., 10 or more layers) may have an average layer thickness of at least 10 microns, such as at least 20, 30, 40, 50, 75, or 100 microns.

The additively manufactured metal-containing component may have a tensile strength of at least 400 MPa. In various embodiments, the additively manufactured metal-containing component has a tensile strength of about, or at least about, 250, 300, 350, 400, 450, or 500 MPa.

It should be noted that while preferred embodiments of this invention relate to additive manufacturing, the principles taught herein may be applied to welding or other metal processing that involves melting and solidification. Also note that certain embodiments can employ a combination of welding and additive manufacturing. In welding, there is generally a weld zone as well as a heat-affected zone, where the heat-affected zone does not necessarily undergo melting and resolidification. The minimization of cracks during welding, due to nanofunctionalization, can apply not only to the weld zone but also to the heat-affected zone.

Some variations provide a welded metal-containing component comprising (i) nickel, (ii) aluminum and/or titanium, and (iii) nanoparticles, wherein the sum of aluminum weight percentage and one-half of titanium weight percentage is at least 3 on a nanoparticle-free basis, and wherein the welded metal-containing component has a microstructure that is substantially crack-free with equiaxed grains.

This disclosure also provides compositions as starting feedstocks that are suitable to make the metal-containing components described herein.

Some variations of the invention provide a composition comprising metal-containing microparticles and nanoparticles, wherein the nanoparticles are smaller (preferably by least 10×) than the microparticles in at least one dimension, wherein the nanoparticles are chemically and/or physically disposed on surfaces of the microparticles, wherein the microparticles comprise (i) nickel and (ii) aluminum and/or titanium, and wherein the sum of aluminum weight percentage and one-half of titanium weight percentage is at least 3 on a nanoparticle-free basis. In preferred embodiments, the composition is a suitable feedstock for additive manufacturing.

In the context of this disclosure, "feedstock" is meant to include any wire, powder, or other geometric form which may be used for additive manufacturing and/or welding. In the case of feedstocks for additive manufacturing, the feedstock may be of any compatible size for common or custom additive manufacturing equipment.

In general, the geometry of the feedstock is not limited and may be, for example, in the form of powder particles, wires, rods, bars, plates, films, coils, spheres, cubes, prisms, cones, irregular shapes, or combinations thereof. In certain embodiments, the feedstock is in the form of a powder, a wire, or a combination thereof (e.g., a wire with powder on the surface). When the feedstock is in the form of powder, the powder particles may have an average diameter from about 1 micron to about 500 microns, such as about 10 microns to about 100 microns, for example. When the feedstock is in the form of a wire, the wire may have an average diameter from about 10 microns to about 1000 microns, such as about 50 microns to about 500 microns, for example.

When in the form of a powder, the powdered feedstock may be in any form in which discrete particles can be reasonably distinguished from each other. The powder may be present as loose powders, a paste, a suspension, or a green body, for example. A green body is an object whose main constituent is weakly bound powder material, before it has been melted and solidified.

In some embodiments, the feedstock composition contains both aluminum and titanium.

In some embodiments, the feedstock composition contains the nanoparticles at a concentration from about 0.01 vol % to about 10 vol % on a total composition basis. The nanoparticles are preferably present in a concentration of at least 0.1 vol %, at least 1 vol %, or at least 5 vol %, in the feedstock composition. In various embodiments, the nanoparticles are present in a concentration of about, or at least about, 0.1, 0.2, 0.5, 1, 2, 3, 4, 5, 6, 7, 8, 9, or 10 vol %.

In some embodiments, the nanoparticles have a largest dimension between about 1 nm and about 5000 nm. A preferred size of nanoparticles is about 2000 nm or less, about 1500 nm or less, or about 1000 nm or less. In some embodiments, nanoparticles are at least 50 nm in size. In certain embodiments, particles with largest dimension between about 1 micron and 1000 microns are used. For convenience of nomenclature, these particles are still referred to as nanoparticles herein). Preferably, the ratio of average particle size of nickel superalloy particles (or grains) to the average particle size of the nanoparticles is at least 5, 10, 20, 50, or 100.

In various embodiments, the nanoparticles may be selected from the group consisting of metals; ceramics; cermets; intermetallic alloys; oxides, carbides, nitrides, borides, or hydrides of metals, ceramics, cermets, or intermetallic alloys; polymers; carbon; and combinations of any of the foregoing.

The nanoparticles may contain at least one element selected from the group consisting of Ce, Co, Al, Ti, V, Sc, Cr, Mn, Fe, Ni, Si, Y, Zr, Nb, Mo, Pd, Hf, Ta, W, Re, Os, Ir, Pt, La, and Yb, for example.

In certain embodiments, the nanoparticles are in the form of cubic spinels containing (i) oxygen and/or sulfur and (ii) at least two elements selected from the group consisting of Al, Co, Ni, Fe, Mn, Cr, Ti, Ce, Zr, Hf, Ta, and Nb.

Nanoparticles, in certain embodiments, are selected from the group consisting of $Al_3Zr$, $Al_3Ta$, $Al_3Nb$, $Al_3Ti$, $TiB$, $TiB_2$, $WC$, $AlB$, and combinations thereof. These multicomponent nanoparticles may be in place of, or in addition to, elemental forms such as zirconium, tantalum, niobium, titanium, or oxides, nitrides, hydrides, carbides, or borides thereof.

Exemplary ceramic materials for the nanoparticles include (but are not limited to) SiC, HfC, TaC, ZrC, NbC, WC, TiC, $TiC_{0.7}N_{0.3}$, VC, $B_4C$, $TiB_2$, $HfB_2$, $TaB_2$, $ZrB_2$, $WB_2$, $NbB_2$, TaN, HfN, BN, ZrN, TiN, NbN, VN, $Si_3N_4$, $Al_2O_3$, $MgAl_2O_3$, $HfO_2$, $ZrO_2$, $Ta_2O_5$, $TiO_2$, $SiO_2$, and oxides of rare-earth elements Y, La, Ce, Pr, Nd, Sm, Eu, Gd, Tb, Dy, Ho Er, Tm, Yb, and/or Lu.

Exemplary metallic materials for the nanoparticles include (but are not limited to) Sc, Ti, V, Cr, Y, Zr, Nb, Mo, Ru, Rh, Pd, La, Ce, Pr, Nd, Sm, Eu, Gd, Tb, Dy, Ho Er, Tm, Yb, Lu, Ta, W, Re, Os, Ir, Pt, Si, or B.

Exemplary polymer materials for the nanoparticles include (but are not limited to) thermoplastic organic or inorganic polymers, or thermoset organic or inorganic polymers. Polymers may be natural or synthetic.

Exemplary carbon or carbon-based materials for the nanoparticles include (but are not limited to) graphite, activated carbon, graphene, carbon fibers, carbon nanostructures (e.g., carbon nanotubes), and diamond (e.g., nanodiamonds).

In some embodiments, the nanoparticles are lattice-matched to within ±5% compared to an otherwise-equivalent metal-containing component that does not contain the nanoparticles. In certain embodiments, the grain-refining nanoparticles are lattice-matched to within ±2% or within ±0.5% compared to an otherwise-equivalent metal-containing component that does not contain the nanoparticles.

In some embodiments, the nanoparticles are atomic density-matched to within ±25% compared to an otherwise-equivalent metal-containing component that does not contain the nanoparticles. In certain embodiments, the grain-refining nanoparticles are atomic density-matched to within ±5% or within ±0.5% compared to an otherwise-equivalent metal-containing component that does not contain the nanoparticles.

In some embodiments, the nickel alloy microparticles have an average microparticle size from about 1 micron to about 1 centimeter. In various embodiments, the average microparticle size is about 5 microns, 10 microns, 50 microns, 100 microns, 200 microns, 500 microns, 1 millimeter, 5 millimeters, or 10 millimeters.

Nanoparticles or nickel alloy microparticles may be spherical or of arbitrary shape with the largest dimension typically not exceeding the above largest dimensions. An exception is structures with extremely high aspect ratios, such as carbon nanotubes in which the dimensions may include up to 100 microns in length but less than 100 nm in diameter (for example). The nanoparticles or microparticles may include a coating of one or more layers of a different material. Mixtures of nanoparticles and microparticles may be used. In some embodiments, microparticles themselves are coated with nanoparticles, and the microparticle/nanoparticle composite is incorporated as a coating or layer on the powder material particles.

The number of nanoparticles per nickel alloy microparticle can vary widely. The average number of individual nanoparticles disposed on one microparticle (equivalently, the average number ratio of nanoparticles to powder microparticles) may be about 10, about $10^2$, about $10^3$, about $10^4$, about $10^5$, or about $10^6$, for example. The nanoparticle distribution on the nickel alloy particle surface can vary. In some embodiments, surface regions contain a relatively higher concentration of nanoparticles, which may be agglomerated at the surface in those regions.

The nanoparticle surface coverage may also vary widely, from about 1% to 100%, in various embodiments. The nanoparticle surface coverage is the average area fraction of nickel alloy particles that is covered by assembled nanoparticles. For example, the nanoparticle surface coverage may be about, or at least about, 1%, 5%, 10%, 20%, 30%, 40%, 50%, 60%, 70%, 80%, 90%, or 100%. Due to the small size of nanoparticles, benefits are possible with less than 1% surface area coverage.

In some embodiments, at least 1% of the surface area of the microparticles contains nanoparticles that are chemically and/or physically disposed on the microparticle surfaces. When higher nanoparticle concentrations are desired in the final material, it is preferred that a higher surface area of the microparticles contains nanoparticles. In various embodiments, at least 1%, 2%, 5%, 10%, 20%, 30%, 40%, 50%, 60%, 70%, 80%, 90%, or 95% of the total surface area of the microparticles contains nanoparticles that are chemically and/or physically disposed on the microparticle surfaces.

In some embodiments, surface functionalization is in the form of a continuous coating or an intermittent coating. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random).

In general, the functionalization (e.g., nanofunctionalization) coating may be continuous or discontinuous. The coating may have several characteristic features. In one embodiment, the coating may be smooth and conformal to the underlying surface. In another embodiment, the coating may be nodular. The nodular growth is often characteristic of kinetic limitations of nanoparticle assembly. For example, the coating may look like cauliflower or a small fractal growing from the surface. These features can be affected by the underling materials, the method of coating, reaction conditions, etc. A coating may or may not be in the form of nanoparticles. That is, the coating may be derived from nanoparticles, and discrete nanoparticles may no longer be present. Various coating techniques may be employed, such as (but not limited to) electroless deposition, immersion deposition, or solution coating. The coating thickness is preferably less than about 20% of the underlying particle diameter, such as less than 15%, 10%, 5%, 2%, or 1% of the underlying particle diameter.

In some embodiments, the surface functionalization also includes direct chemical or physical modification of the surface of the powder materials, such as to enhance the bonding of the nanoparticles or microparticles. Direct chemical modification of the surface of the powder materials, such as addition of molecules, may also be utilized to affect the solidification behavior of the powder materials. A plurality of surface modifications described herein may be used simultaneously.

The feedstock composition may further contain one or more alloying elements, separate from the nanoparticles, selected from the group consisting of H, Li, Be, B, C, N, O, F, Na, P, S, Cl, K, Si, Fe, Cu, Mn, Mg, Cr, V, Bi, Pb, Zr, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof.

In some embodiments, the feedstock composition contains, on a nanoparticle-free basis, about 50-65 wt % Ni, about 8-10 wt % Co, about 8-10 wt % W, about 7-9 wt % Cr, about 4-6 wt % Al, about 1-4 wt % Ta, about 1-2 wt % Hf, about 1-2 wt % Ti, about 0-1 wt % Mo, and about 0-0.5 wt % C.

The feedstock composition may be an additive manufacturing feedstock. Alternatively, or additionally, the composition may be a welding feedstock, or a general feedstock for metal alloy processing.

Nanoparticles may be attached to base particles (nickel superalloy particles) using electrostatic forces, Van der Waals forces, chemical bonds, physical bonds, and/or any other force. A chemical bond is the force that holds atoms together in a molecule or compound. Electrostatic and Van der Waals forces are examples of physical forces that can cause bonding. A physical bond is a bond that arises when molecular entities become entangled in space. Typically, chemical bonds are stronger than physical bonds. Chemical bonds may include ionic bonds, covalent bonds, or a combination thereof.

Methods of producing nanofunctionalized particles are generally not limited and may include immersion deposition, electroless deposition, vapor coating, solution/suspension coating of particles with or without organic ligands, utilizing electrostatic forces and/or Van der Waals forces to attach particles through mixing, and so on. U.S. patent application Ser. No. 14/720,757 (filed May 23, 2015), U.S. patent application Ser. No. 14/720,756 (filed May 23, 2015), and U.S. patent application Ser. No. 14/860,332 (filed Sep. 21, 2015), each commonly owned with the assignee of this patent application, are hereby incorporated by reference herein. These disclosures relate to methods of coating certain materials onto micropowders, in some embodiments.

Some variations provide a method of making an additively manufactured or welded metal-containing component, the method comprising:
(a) obtaining a composition comprising metal-containing microparticles and nanoparticles, wherein the nanoparticles are smaller than the microparticles in at least one dimension, wherein the nanoparticles are chemically and/or physically disposed on surfaces of the microparticles, wherein the microparticles comprise (i) nickel and (ii) aluminum and/or titanium, and wherein the sum of aluminum weight percentage and one-half of titanium weight percentage is at least 3 on a nanoparticle-free basis;
(b) exposing a first amount of the composition to an energy source for melting the first amount of the composition, thereby generating a first melt layer; and
(c) solidifying the first melt layer, thereby generating an additively manufactured or welded metal-containing component,
wherein the additively manufactured or welded metal-containing component has a microstructure that preferably is substantially crack-free with equiaxed grains.

The energy source in step (b) may be provided by a laser beam, an electron beam, alternating current, direct current, plasma energy, induction heating from an applied magnetic field, ultrasonic energy, other sources, or a combination thereof. Typically, the energy source is a laser beam or an electron beam.

Process steps (b) and (c) may utilize a technique selected from the group consisting of selective laser melting, electron beam melting, laser engineered net shaping, selective laser sintering, direct metal laser sintering, integrated laser melting with machining, laser powder injection, laser consolidation, direct metal deposition, wire-directed energy deposition, plasma arc-based fabrication, ultrasonic consolidation, and combinations thereof, for example.

In certain embodiments, the additive manufacturing process is selected from the group consisting of selective laser melting, energy-beam melting, laser engineered net shaping, and combinations thereof.

Selective laser melting utilizes a laser (e.g., Yb-fiber laser) to provide energy for melting. Selective laser melting designed to use a high power-density laser to melt and fuse metallic powders together. The process has the ability to fully melt the metal material into a solid 3D part. A combination of direct drive motors and mirrors, rather than fixed optical lens, may be employed. An inert atmosphere is usually employed. A vacuum chamber may be fully purged between build cycles, allowing for lower oxygen concentrations and reduced gas leakage.

Electron beam melting uses a heated powder bed of metal that is then melted and formed layer by layer, in a vacuum, using an electron beam energy source similar to that of an electron microscope. Metal powder is welded together, layer by layer, under vacuum.

Laser engineered net shaping is a powder-injected technique that operates by injecting metal powder into a molten pool of metal using a laser as the energy source. Laser engineered net shaping is useful for fabricating metal parts directly from a computer-aided design solid model by using a metal powder injected into a molten pool created by a focused, high-powered laser beam. Laser engineered net shaping is similar to selective laser sintering, but the metal powder is applied only where material is being added to the part at that moment. Note that "net shaping" is meant to encompass "near net" fabrication.

Direct metal laser sintering process works by melting fine powders of metal in a powder bed, layer by layer. A laser supplies the necessary energy and the system operates in a protective atmosphere, typically of nitrogen or argon.

Another approach utilizes powder injection to provide the material to be deposited. Instead of a bed of powder that is reacted with an energy beam, powder is injected through a nozzle that is then melted to deposit material. The powder may be injected through an inert carrier gas or by gravity feed. A separate shielding gas may be used to protect the molten metal pool from oxidation.

Directed energy deposition utilizes focused energy (either an electron beam or laser beam) to fuse materials by melting as the material is being deposited. Powder or wire feedstock can be utilized with this process. Powder-fed systems, such as laser metal deposition and laser engineered net shaping, blow powder through a nozzle, with the powder melted by a laser beam on the surface of the part. Laser-based wirefeed systems, such as laser metal deposition-wire, feed wire through a nozzle with the wire melted by a laser, with inert gas shielding in either an open environment (gas surrounding the laser), or in a sealed gas enclosure or chamber.

Some embodiments utilize wire feedstock and an electron beam heat source to produce a near-net shape part inside a vacuum chamber. An electron beam gun deposits metal via the wire feedstock, layer by layer, until the part reaches the desired shape. Then the part optionally undergoes finish heat treatment and machining. Wire can be preferred over powder for safety and cost reasons.

Herderick, "Additive Manufacturing of Metals: A Review," *Proceedings of Materials Science and Technology* 2011, Additive Manufacturing of Metals, Columbus, Ohio, 2011, pp. 1413-1425, is hereby incorporated by reference herein for its teaching of various additive manufacturing techniques.

In any of these additive manufacturing techniques, post-production processes such as heat treatment, light machining, surface finishing, coloring, stamping, or other finishing operations may be applied. Also, several additive manufactured parts may be joined together chemically or physically to produce a final object.

The additively manufactured or welded metal-containing component, following recovery, preferably has a microstructure that is substantially crack-free. In some embodiments, the additively manufactured or welded metal-containing component has a microstructure that is substantially free of porous void defects.

In some embodiments, the additively manufactured or welded metal-containing component is characterized by an average grain size of less than 1 millimeter, such as less than 10 microns.

In many embodiments, an additively manufactured metal-containing component has a microstructure with a crystallographic texture that is not solely oriented in the additive-manufacturing build direction. For example, the solid layers may have differing primary growth-direction angles with respect to each other.

EXAMPLE

This Example demonstrates fabrication of nanofunctionalized MAR-M-247 with cobalt oxide (CoO) nanoparticles.

The nominal composition of MAR-M-247 nickel-based superalloy in this Example is 10 wt % Co, 10 wt % W, 8 wt % Cr, 6 wt % Al, 3 wt % Ta, 1 wt % Hf, 1 wt % Ti, 0.6 wt % Mo, 0.2 wt % C, and the balance Ni. This starting feedstock composition lies within the highly crack-susceptible region shown in FIG. 1.

CoO nanoparticles (with particle sizes less than 1000 nanometers) are introduced to the MAR-M-247 material, utilizing methods and apparatus described in U.S. patent application Ser. No. 15/996,439, filed Jun. 2, 2018, which is hereby incorporated by reference herein. The CoO is at a volumetric concentration of 1 vol %. The CoO content is separate from the 10 wt % Co in the nominal MAR-M-247 composition. The presence of CoO nanoparticles causes the composition to deviate from the nominal composition, e.g. 10 wt % W becomes slightly less than 10 wt % in the final, nanofunctionalized material. On a nanoparticle-free basis, the nanofunctionalized composition remains the same.

The nanofunctionalized composition is processed via selective laser melting using a Concept Laser M2 (Concept Laser GmbH, Germany) utilizing the Inconel 718 parameter sets, under an inert atmosphere containing argon in this example.

Figure 2A:
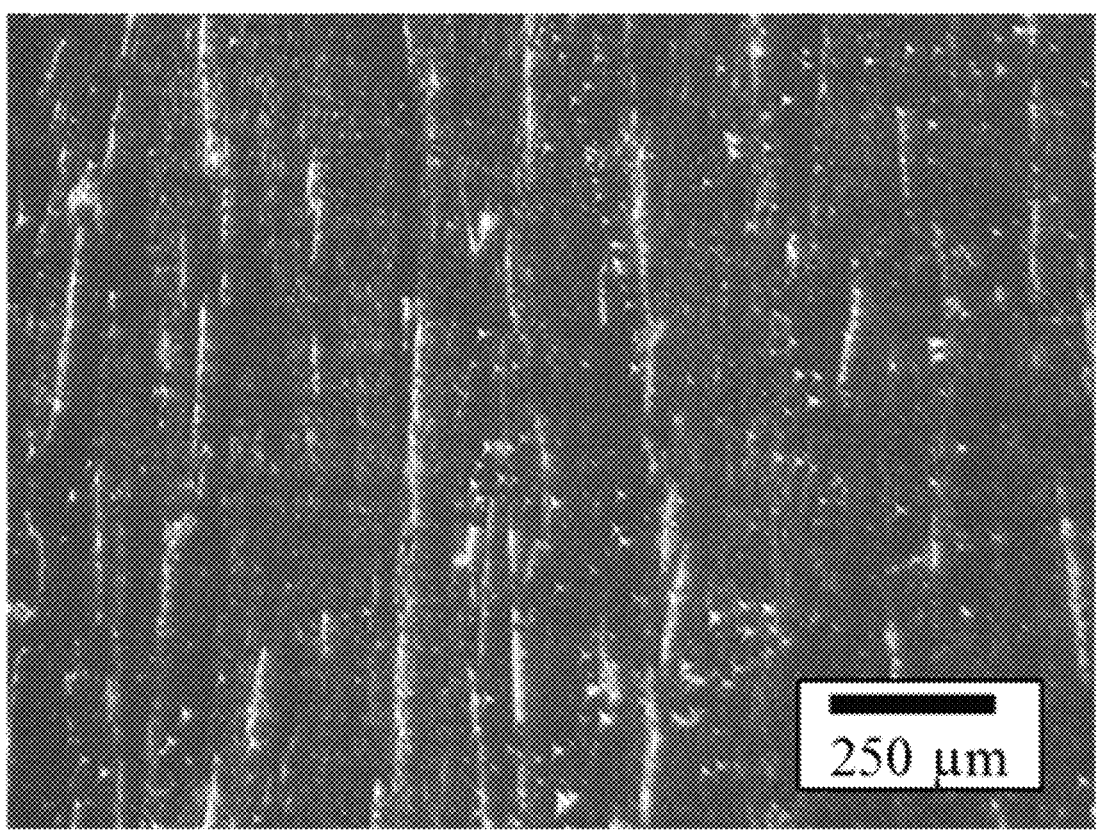
FIG. 2A shows an SEM micrograph (scale bar=250 μm) of a typical cracked MAR-M-247 nickel superalloy microstructure produced without nanofunctionalization, in the Example.
Figure 2B:
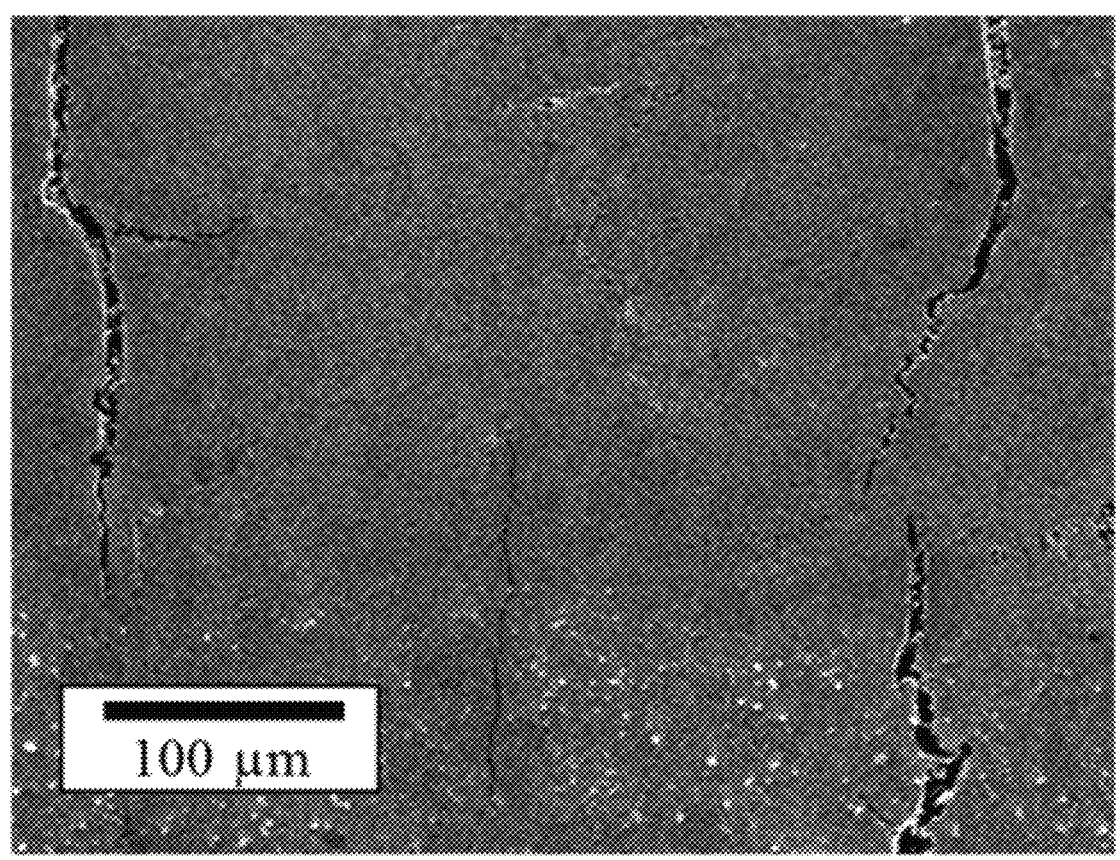
FIG. 2B shows an SEM micrograph (scale bar=100 μm) of a typical cracked MAR-M-247 nickel superalloy microstructure produced without nanofunctionalization, in the Example.
Figure 3A:
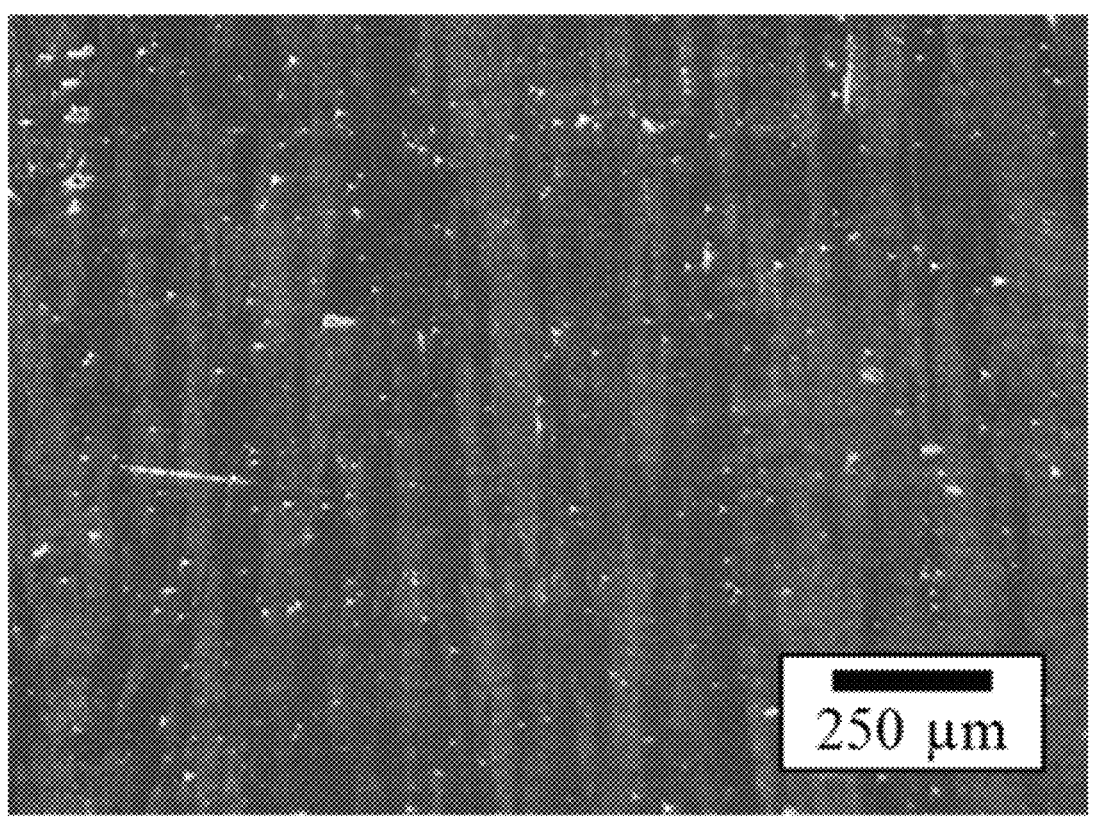
FIG. 3A shows an SEM micrograph (scale bar=250 μm) of a substantially crack-free microstructure resulting from nanofunctionalization of MAR-M-247 nickel superalloy with CoO nanoparticles, in the Example.
Figure 3B:
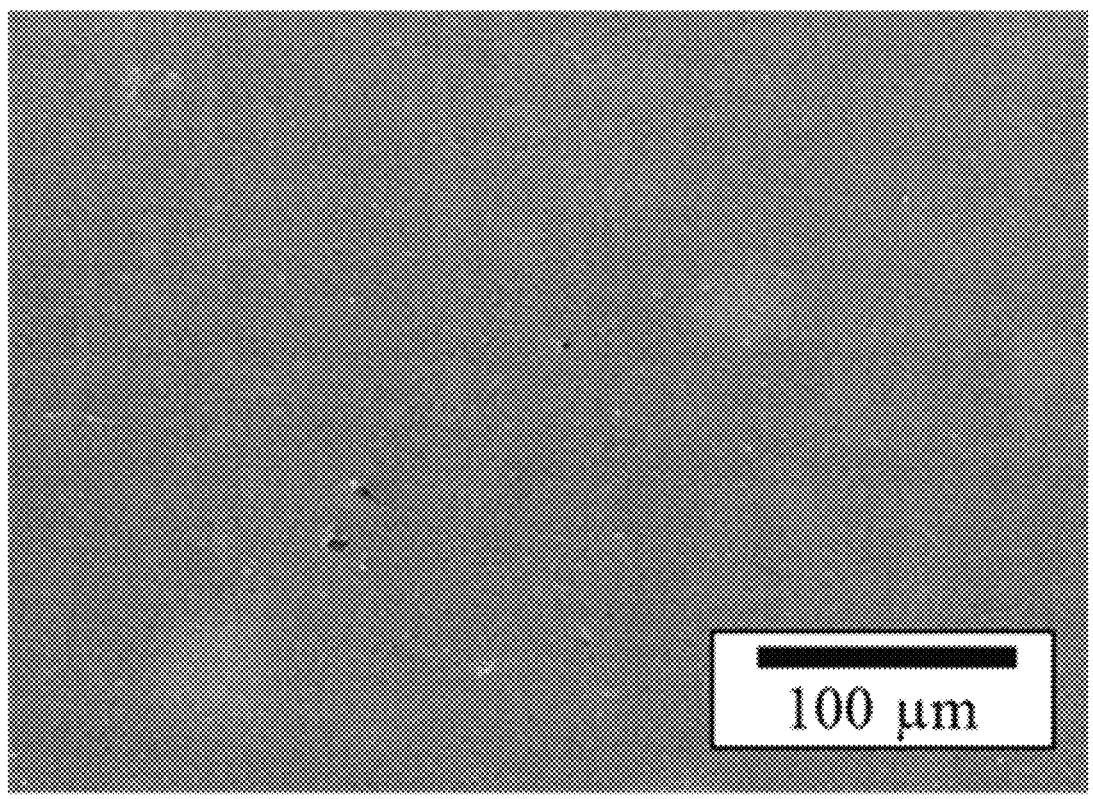
FIG. 3B shows an SEM micrograph (scale bar=100 μm) of a substantially crack-free microstructure resulting from nanofunctionalization of MAR-M-247 nickel superalloy with CoO nanoparticles, in the Example.

Utilizing the methodology described in this specification, the nanofunctionalization process results in a substantially crack-free microstructure as shown in the scanning electron microscopy (SEM) micrographs of FIGS. 3A and 3B. This is compared to typical cracked microstructures produced without nanofunctionalization, as shown in the SEM micrographs of FIGS. 2A and 2B. The scale bars of FIGS. 2A and 3A are 250 μm, and the scale bars of FIGS. 3A and 3A are 100 μm.

FIGS. 3A and 3B show the crack-free microstructures with 1 vol % CoO nanoparticles incorporated into MAR-M-247 superalloy that is melted and resolidified via selective laser melting (additive manufacturing). Through additions of targeted nanoparticles (in this specific case, 1 vol % CoO), cracking is essentially eliminated without major alterations to the additive manufacturing parameters.

During additive manufacturing, the CoO nanoparticles create nucleation sites, or react to form nucleation sites, for the nickel alloy. CoO was successful in the Example; many other nanoparticle types are possible, including oxides, carbides, nitrides, borides, or combinations of the elements Ce, Co, Al, Ti, V, Sc, Cr, Mn, Fe, Ni, Si, Y, Zr, Nb, Mo, Pd, Hf, Ta, W, Re, Os, Ir, Pt, La, Yb, for example.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A powder composition for additive manufacturing or welding, wherein said powder composition comprises metal-containing microparticles and from about 0.01 vol % to about 3 vol % nanoparticles, wherein said nanoparticles are selected from metals, intermetallic alloys, or hydrides thereof, wherein said nanoparticles are compositionally different than said microparticles, wherein said nanoparticles are smaller than said microparticles in at least one dimension, wherein said nanoparticles are characterized by a largest dimension from about 50 nanometers to about 5000 nanometers, wherein said nanoparticles are chemically bonded onto surfaces of said microparticles to form a continuous coating or an intermittent coating, wherein at least 10% of total surface area of said microparticles is covered by said nanoparticles, wherein said microparticles comprise (i) nickel and (ii) aluminum and/or titanium, wherein the sum of aluminum weight percentage and one-half of titanium weight percentage is at least 3 on a nanoparticle-free basis, and wherein said powder composition contains, on a nanoparticle-free basis, about 40 wt % to about 80 wt % Ni, 0 to about 10 wt % Al, and 0 to about 10 wt % Ti.

2. The powder composition of claim 1, wherein said composition contains both aluminum and titanium.

3. The powder composition of claim 1, wherein said powder composition contains said nanoparticles at a concentration from about 0.01 vol % to about 1 vol % on a total composition basis.

4. The powder composition of claim 1, wherein said nanoparticles are consolidated in a three-dimensional architecture throughout said powder composition.

5. The powder composition of claim 1, wherein said nanoparticles contain at least one element selected from the group consisting of Ce, Co, Al, Ti, V, Sc, Cr, Mn, Fe, Ni, Si, Y, Zr, Nb, Mo, Pd, Hf, Ta, W, Re, Os, Ir, Pt, La, and Yb.

6. The powder composition of claim 1, wherein said powder composition further contains one or more alloying elements, separate from said nanoparticles, selected from the group consisting of H, Li, Be, B, C, N, O, F, Na, P, S, Cl, K, Si, Fe, Cu, Mn, Mg, Cr, V, Bi, Pb, Zr, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof.

7. The powder composition of claim 1, wherein said powder composition contains, on a nanoparticle-free basis, about 50-65 wt % Ni, about 8-10 wt % Co, about 8-10 wt % W, about 7-9 wt % Cr, about 4-6 wt % Al, about 1-4 wt % Ta, about 1-2 wt % Hf, about 1-2 wt % Ti, 0 to about 1 wt % Mo, and 0 to about 0.5 wt % C.

8. The powder composition of claim 1, wherein at least 30% of said total surface area of said microparticles is covered by said nanoparticles.

9. The powder composition of claim 1, wherein at least 50% of said total surface area of said microparticles is covered by said nanoparticles.

10. The powder composition of claim 1, wherein at least 90% of said total surface area of said microparticles is covered by said nanoparticles.

* * * * *